Patented Sept. 21, 1926.

1,600,573

UNITED STATES PATENT OFFICE.

RAYMOND W. BELL, OF WASHINGTON, DISTRICT OF COLUMBIA, ASSIGNOR TO THE GOVERNMENT AND THE PEOPLE OF THE UNITED STATES OF AMERICA.

PROCESS FOR THE MANUFACTURE OF CRUDE MILK SUGAR.

No Drawing. Application filed April 15, 1926. Serial No. 102,324.

(GRANTED UNDER THE ACT OF MARCH 3, 1883; 22 STAT. L. 625.)

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to me of any royalty thereon.

Whey is the product remaining after the removal of substantially all of the fat and casein from milk. A representative analysis will show that it contains 93.0 per cent water, 5.0 per cent lactose (milk sugar), 1.0 per cent protein, 0.6 per cent ash (mostly inorganic salts), and 0.4 per cent milk fat.

The modern process of making crude milk sugar may be outlined as follows: Any butter fat present is removed by a separator. The protein material may be removed by means of a filter press after precipitating it by heating and the addition of an acid or lime or both, or it may be left in the whey till later. The whey is then evaporated under vacuum until it contains about 60 per cent total solids. It is then run into crystallizers which have water jackets in which cold water is circulated. After crystallization has taken place the material is centrifuged and yields about 3.8 per cent of the weight of the original whey as wet raw sugar containing about 88 per cent lactose.

In separating the lactose in this way the proteins are thrown out in insoluble form and have practically no value. The improvement in this method consists in adjusting the reaction of the whey to a hydrogen ion concentration of about pH 7.0 on the Sorenson scale. This pH value may be somewhat less or a little greater than that mentioned without defeating the purpose of adding the alkali, which is to facilitate the separation of the crystallized lactose from the serum of the concentrated whey. In adjusting the reaction of the whey to the proper hydrogen ion concentration sodium hydroxide or any other suitable alkali may be used.

After the proper reaction of the whey has been obtained the whey is forewarmed to a temperature of about 60° C. and concentrated to a point at which the lactose just fails to crystallize. The evaporation is done most efficiently in a vacuum pan, but it is not essential to the process that a vacuum pan be used. It is essential that the whey be maintained at the proper reaction and temperature (below the coagulating point of albumen) at all times. The concentrated whey is removed from the concentrator into a suitable container or containers and held by any convenient means at a temperature of about 0.0° C. or lower. After sufficient time has elapsed (which may be over night or longer) for maximum crystallization of the lactose to take place, the product is removed from the cooler and stirred. The crystallized lactose is removed from the concentrated whey serum as soon as possible thereafter by a filter press of the proper type or by means of a sugar centrifugal. In either case the sugar obtained may be further purified by washing in the filter or centrifugal with a small amount of cold water.

Crystallization of the lactose may take place after the proteins have been removed in the usual way, or with the proteins still in solution.

By this method a greater yield of lactose is obtained than by the usual method of crystallizing at higher temperatures. By this procedure a yield of five pounds of 85 per cent lactose per 100 pounds of whey can be obtained.

I claim:

A process for the manufacture of crude milk sugar, consisting in removing the casein and fat in the milk so as to obtain whey the acid reaction of which is adjusted to a pH of about 7.0 by the addition of suitable alkali, forewarming the whey thus treated to about 60° C., concentrating the whey at a temperature below the coagulating point of the albumen contained therein to a concentration at which the lactose just fails to crystallize, cooling the concentrate to about 0.0° C., maintaining such last named temperature until a maximum crystallization of the lactose has taken place, and removing the lactose crystals by any suitable means, such as centrifuging.

RAYMOND W. BELL.